Figure 1:
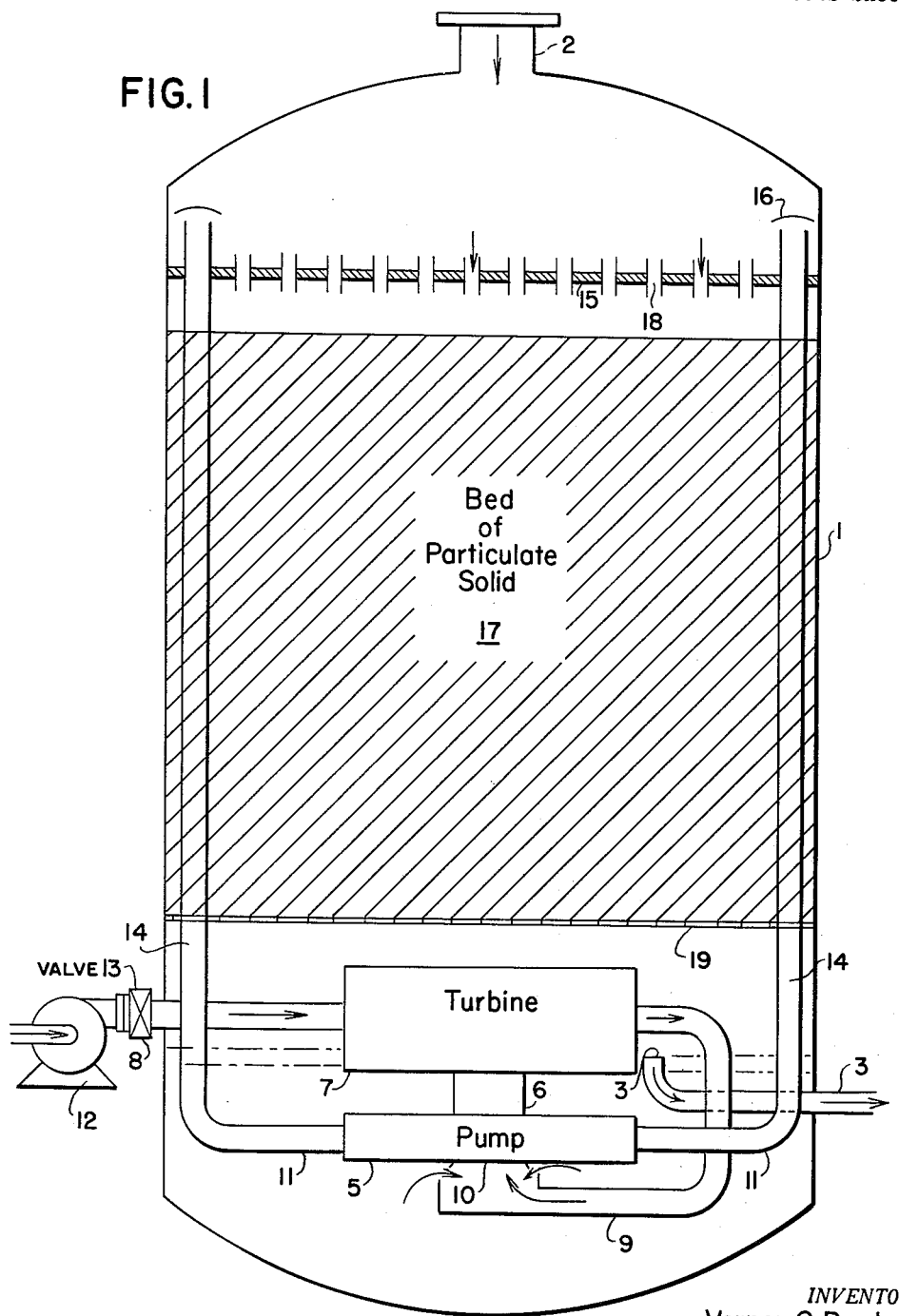

June 27, 1961  V. O. BOWLES ET AL  2,990,237
CATALYTIC HYDROGENATION
Filed July 5, 1957  2 Sheets-Sheet 1

INVENTORS
Vernon O. Bowles
BY  Geoffrey W. Robbins
*Francis Johnston*
AGENT.

United States Patent Office

2,990,237
Patented June 27, 1961

2,990,237
CATALYTIC HYDROGENATION
Vernon O. Bowles, Rye, and Geoffrey W. Robbins, Mamaroneck, N.Y., assignors to Socony Mobil Oil Company, Inc., a corporation of New York
Filed July 5, 1957, Ser. No. 670,247
8 Claims. (Cl. 23—1)

The present invention relates to a method of controlling the reaction temperature of exothermic reactions and to an apparatus therefor.

Many catalytic reactions involving one or more fluid reactants are exothermic. The control of the temperature of the reaction usually is important. Thus, for example, in the hydrocracking of petroleum oils substantial quantities of heat are released. Since undesirable side reactions occur at a temperature slightly above the required reaction temperature it is necessary to maintain the temperature rise in the reactor to a low value.

Illustrative of the problem is the hydrocracking of heavy residue such as 25 percent bottoms, i.e., the bottoms of the distillation representing 25 percent by volume of Kuwait crude. Such a heavy residue is charged to a reactor containing a hydrocracking catalyst, i.e., a catalyst combining ability to hydrogenate and ability to crack hydrocarbons, e.g., a mixture of oxides of cobalt and molybdenum on alumina, together with an amount of extraneous make-up hydrogen, and hydrogen-rich recycle gas containing at least about 50 percent hydrogen, equal to about 6000 s.c.f. per barrel of reduced crude charged. Illustrative of suitable operating conditions are the following:

| | |
|---|---|
| Space velocity _____v./v./hr__ | 0.5 |
| Pressure _____p.s.i.g__ | 3000 |
| Reactor inlet temp., ° F. _____ | 775 |
| Reactor outlet temp., ° F. _____ | 800 |
| Heat of reaction (B.t.u./lb. of fresh feed) _____ | 325 |

Since this reaction results in the release of substantial quantities of heat and since it is necessary to conduct the operation at a temperature level approaching the coking threshold, it is desirable to maintain the temperature rise in the reactor to a low value. The use of reactor effluent recirculation has been proposed as a means of controlling reactor temperature rise. For example, the circulation of an amount of liquid equal to about sixteen times that of the fresh feed would limit the reactor temperature rise to approximately 25° F. in a simple downflow reactor. In this arrangement the heat of reaction absorbed in the recirculated liquid phase effluent would be employed to heat the fresh feed from approximately 400° F. to a temperature suitable for the reaction as the fresh feed would be introduced into the hot recycle liquid being circulated to the top of the downflow reactor.

Since this type of processing requires a circulation of very large quantities of hot and frequently corrosive liquid, it is desirable to avoid conducting this large quantity of liquid through piping to an external pump and back to the top of the reactor, especially at the severe temperature and pressure conditions existent. The pump and piping for such a purpose would be extremely difficult to design and would undoubtedly be very expensive.

The present invention provides for recirculating an amount of the liquid phase of the reactor effluent required to heat the fresh feed from about 400° F. to a temperature suitable for the reaction with an internal pump driven by a turbine in which the driving force for the turbine is provided either by the fresh feed or by the hydrogen-containing recycle gas. Accordingly, both the pump and the turbine are located in the bottom of the reactor, at about, or submerged below, the liquid level and the turbine is driven by energy supplied with either the fresh oil feed or with the recycle gas feed.

For example, when a pressure difference of 40 p.s.i. is required to lift the oil to be recycled to the top of the reactor and in addition compensate for the pressure drop through the bed of particle-form solid catalyst, then approximately 1400 p.s.i. of differential pressure over reactor pressure in the fresh oil feed provides the energy for recycle liquid circulation of approximately 16 to 1. The fresh oil feed after passing through the internal turbine flows into the pool of reactor effluent liquid at or near the pump suction in such a manner that it is preferentially delivered to the top of the reactor with the recycled liquid rather than partly by-passed to the reactor effluent outlet. Alternately, when hydrogen-rich recycle gas is used to drive the internal turbine, the required pumping energy is delivered when it is available at a pressure of approximately 1500 p.s.i. above reactor pressure. After passing through the internal turbine this gas preferably is conducted separately to the top of the reactor.

Advantageously, a plurality of internal pumping units within the reactor can be employed so that each internal pumping unit can be removed through a reasonably sized manway for servicing and inspection.

The bearings of the turbine(s) and the pump(s) can be lubricated and cooled with a portion of unheated fresh oil charge. Alternately, a low grade lubricating oil stock can be used for the purpose and can be allowed to flow into the reactor as a component of the fresh feed.

Thus, the present invention provides a method of conducting an exothermic reaction in which at least one of the reactants is a gas or a liquid and at least a part of the reactor effluent products is a liquid wherein the reactor temperature is controlled by recycling a large volume of said liquid reactor effluent material relative to the volume of fresh liquid reactant and wherein the energy for recycling said large volume of said liquid reactor effluent material is derived from energy in the fresh feed or from the energy in a recycle gas stream.

Figure 2:
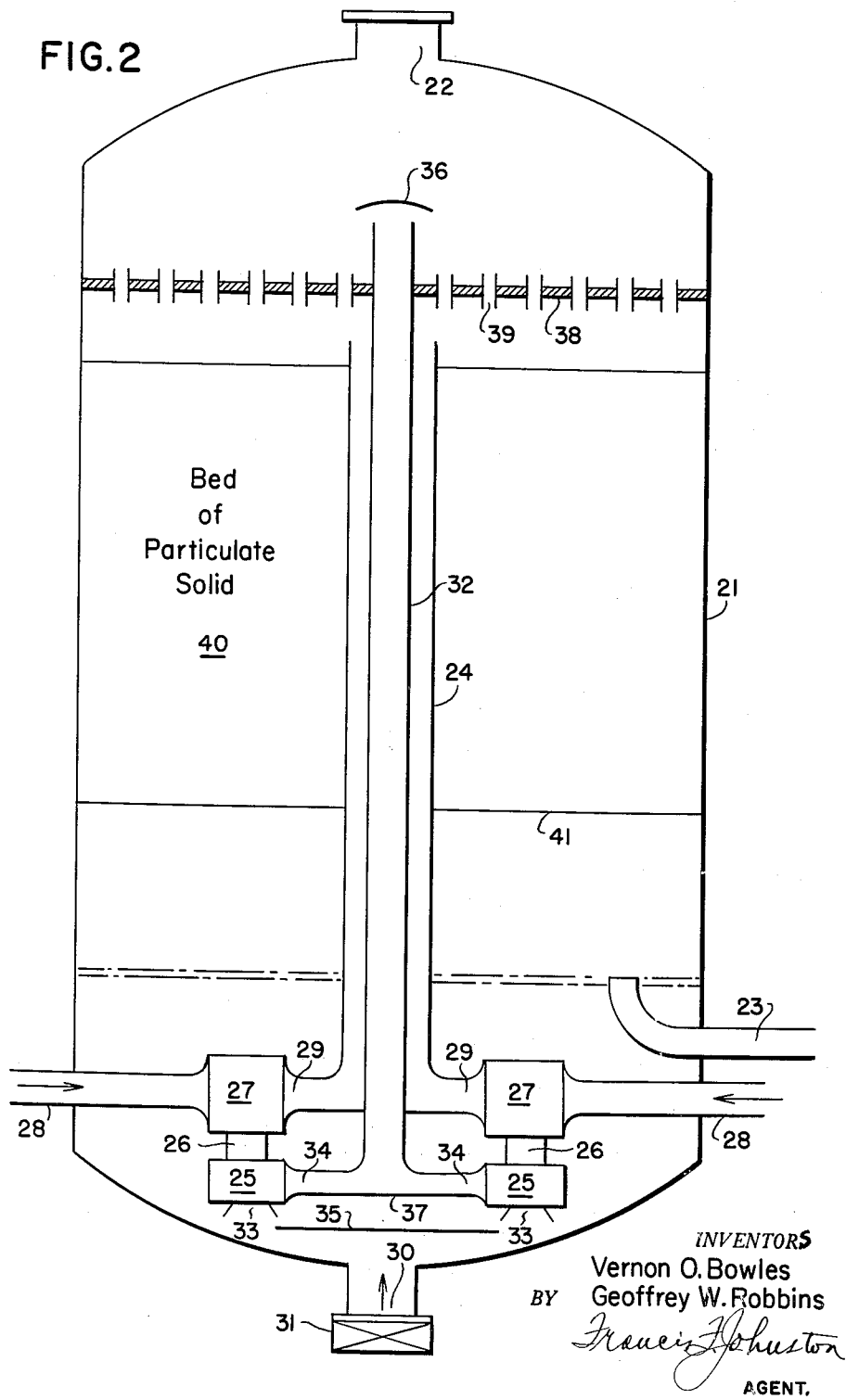

Illustrative of an apparatus for carrying out exothermic reactions and controlling the reactor temperature by recycling a volume of the liquid phase of a reactor effluent relatively large with respect to the volume of fresh feed by means of an internal pump driven by an internal turbine which in turn is driven by fresh feed or recycle gas are the drawings in which FIGURE 1 is a vertical section of a reactor for catalytic reaction involving a liquid feed, recycle gas, and a liquid product recycled by an internal pump driven by an internal turbine the energy for driving which is obtained from the fresh feed entering the reactor, and FIGURE 2 is a vertical section of a reactor for catalytic reaction involving a liquid feed, recycle gas, and a liquid product recycled by a plurality of internal pumps each driven by an internal turbine the energy for driving which is provided by the recycle gas.

Referring to FIGURE 1; a reactor 1, suitably constructed to withstand reaction pressures and suitably insulated, is provided with a gas inlet 2 in the vicinity of the top thereof. In the vicinity of the bottom of reactor 1 is a reactor draw-off 3. Reactor draw-off 3 is spaced from the bottom of reactor 1 in such a manner that fresh feed discharged from the turbine flows preferentially into the pump suction and not to the reactor drawoff 3. The liquid level is suitably controlled so that pump suction 10 is at all times submerged when pump 5 is turbine driven. Pump 5 has a capacity to circulate 10 to 25 times the volume of fresh feed introduced into the reactor and is connected by shaft 6 to turbine 7.

Turbine 7 is provided with a fluid inlet 8 and a fluid outlet 9. The construction of such a turbine is so well-known as not to require description. Furthermore, the details of the construction of such a turbine and pump are not part of the present invention.

Pump 5 is provided with an oil inlet 10 and one or more charge oil outlets 11 (of which two are shown). It is preferred, as shown in FIGURE 1, to use a centrifugal type of pump although a piston-type of pump is not precluded. Furthermore, it is preferred to so dispose turbine fluid outlet 9 with respect to pump inlet 10 that the fresh feed will be preferentially pumped to the catalyst section rather than partly by-passed to the reactor effluent outlet 3.

The oil providing the energy to drive turbine 7 is delivered to turbine 7 by pump 12 through pipe 8. Valve 13 can be used to regulate the amount of energy delivered to turbine 7 or alternatively pump 12 can be regulated so as to provide the required amount of energy without the use of valve 13. As explained hereinbefore, the reactor liquid feed which is the turbine drive fluid is delivered to turbine 7 at a pressure sufficiently higher than the pressure in reactor 1 to provide the energy to drive pump 5 to circulate the required volume of liquid phase recycle material to control the temperature of the reactor and to deliver the fresh feed (and recycle) to the top of the reactor.

The charge oil outlet(s) 11 of pump 5 are connected to one or more oil risers 14. Alternatively, the charge oil outlet(s) 11 of pump(s) 5 is connected to a charge oil outlet manifold and the riser(s) 14 is connected with the aforesaid charge oil outlet manifold. In the simplest application a single pump outlet pipe delivers fresh feed plus recycled liquid reactor effluent to the top of the reactor.

The charge oil risers 14 are of any number and design suitable for delivering the charge oil and recycled liquid reactor effluent to distribution plate 15. The charge oil risers are distributed over the cross-section of the reactor in any convenient manner to properly deliver charge oil to the surface of distribution deck 15. Each riser 14 extends above distribution deck 15 a distance sufficient to permit free flow of the charge and recycled oil to the surface of distribution deck 15. Each charge oil riser 14 is shown provided with a deflector 16, but any suitable arrangement can be employed. Deflector or spreader 16 is of any suitable construction and mounted in any suitable manner to ensure that the recycle and charge oil flows onto distribution deck 15 in a substantially uniform manner.

Distribution deck 15 is of any suitable construction to ensure substantially uniform distribution of the charge oil over the cross-section of catalyst bed 17. One form of distribution deck is that illustrated. As illustrated, distribution deck 15 comprises a plate having a plurality of conduits 18 therein. The number of conduits 18, and the cross-sections thereof, are correlated with the area served to provide delivery of substantially uniform amounts of charge oil and recycle liquid to the entire cross-section of the catalyst bed. Distribution deck 15 is rigidly mounted in a substantially horizontal plane in any suitable liquid- and gas-tight manner.

The bed of particle-form solid catalytic material, for brevity referred to herein as the catalyst bed, is supported in any suitable manner as by perforated plate 19. Catalyst bed support 19 is mounted horizontally in any suitable manner beneath distribution deck 15 and above turbine 7 and reactor effluent outlet 3 to permit the formation of a pool of liquid in which the suction of the pump is submerged and of sufficient depth that the fresh charge oil will preferentially flow to pump inlet 10.

Uniformity of distribution of the recycled liquid and charge oil can be improved by superposing upon the top of catalyst bed 17 a layer of inert pellets (chemically inert), preferably spherical in shape, through which the recycled liquid and charge oil percolates. The use of such a layer of inert pellets to improve the distribution of charge oil is more fully described in a United States application for Letters Patent to be filed.

In FIGURE 2 is illustrated a reactor wherein the product is recycled to control the reactor temperature as in FIGURE 1. However, in FIGURE 2 a plurality of pump and turbine pumping units each of which is sized to be inspected, maintained and/or removed through a suitable manway are illustrated. In addition, the driving force for the turbines of the plurality of pumping units is supplied by the energy of the recycle gas stream. Those skilled in the art will recognize that a single pumping unit such as illustrated in FIGURE 1 can be driven by the energy of the recycle gas or gaseous reactant and that the use of piston-type equipment is not precluded.

Thus, in FIGURE 2 a reactor 21 is provided with a gaseous reactant inlet 22 for introduction of gaseous reactant, if any, in excess of that required to drive the turbines of the plurality of pumping units. In other words, when the requirement for gaseous reactant such as recycle gas is greater than the quantity required to drive the turbines of the pumping units the additional gaseous reactant is introduced through gaseous reactant inlet 22. Reactor 21 is provided with a reactor effluent outlet 23 in the region of the bottom thereof. Reactor 21 is provided with a charge oil inlet 30 located in such a position as to ensure uniform distribution of charge oil and recycle liquid over the cross-section of reactor bed 40 or over liquid distributor plate 38. Alternately, the charge oil inlet can be located near the bottom of the reactor with internal piping connections to the section(s) of pump(s) 25 or where internal piping connections are not provided the charge oil inlet can be baffled.

Reactor 21 is provided with one or a plurality of pumping units comprising a turbine 27, a pump 25 (preferably of centrifugal type but piston type is not precluded) and a shaft 26 on which both the turbine rotor and the pump rotor are mounted. Since the construction of the turbine and pump are so well-known as not to require description and, since the turbine and pump are not a part of the present invention, discussion of the details of construction thereof is omitted.

Turbine(s) 27 is driven by the energy of the gaseous material flowing to the reactor, for example, hydrogen-containing recycle gas, flowing through turbine gas inlet(s) 28 at a pressure about 500 to about 2000 p.s.i. greater than reactor pressure. The gaseous material leaves turbine(s) 27 through turbine outlet(s) 29 through which the gaseous material flows to riser(s) 24.

As illustrated in FIGURE 2, the gaseous material leaves turbine(s) 27 through outlet(s) 29 and enters a single gas riser 24. Those skilled in the art will recognize that in place of single riser 24 a plurality of risers can be used and that each riser of the plurality can be connected to a single pump or that the plurality of risers can be manifolded to the outlet of a single pump or to the outlets of a plurality of pumps.

Fresh charge oil enters the reactor through charge oil inlet 30 under control of valve 31. The fresh charge oil preferentially flows to the inlet(s) 33 of pump(s) 25 by-passing products outlet 23. When internal piping providing for delivery of the charge oil directly to the suction of the pump(s) 25 is not provided, charge oil inlet 30 is baffled in any suitable manner as by baffle 35 so that the charge oil flows preferentially to the suction(s) of pump(s) 25. The fresh charge oil and liquid reactor effluent are picked up by the pumps in the ratio of about 5 to about 40, preferably 10–25, volumes of liquid reactor effluent per volume of fresh oil, this being the ratio of liquid reactor effluent to fresh charge oil in the vicinity of the pump intakes. The mixed oil charge, i.e., recycled liquid reactor effluent and fresh oil is discharged by pumps 25 into discharge conduits 34 through which the mixed oil charge flows to riser 32 having deflector-spreader 36. Riser(s) 32 and deflector-spreader(s)

36 are of any suitable construction to deliver charge oil and recycled liquid to distributor deck 36 where substantially uniform distribution thereof takes place.

The gaseous material (as shown) flows from turbines 27 through conduits 29 to the annulus between the riser 32 and conduit 24 and is discharged below distribution deck 38 and above the surface of the bed 40 of particle-form catalyst. While distribution deck 38 serves as a baffle, when necessary or desirable additional baffles can be mounted to distribute the gaseous material substantially uniformly in the space between the surface of bed 40 and distribution deck 38. Alternately, conduit 24 can be extended above distribution deck 38 and the gaseous material being released thereabove can flow downwardly through downpipes 39 concurrent with the mixed oil charge flowing down through distribution deck 38. Furthermore, conduit 24 can be replaced by a plurality of gas risers manifolded to turbine outlets 29 in any suitable manner and riser 32 can be replaced by a plurality of mixed oil charge risers manifolded to pump outlets 34 in any suitable manner.

As in FIGURE 1, reactor 21 is provided with a distribution deck 38 horizontally mounted in any suitable liquid- and gas-tight manner somewhat below the level of deflector-spreader 36. In its simplest form distribution deck 38 is constructed of a plate having a plurality of conduits 39. Distribution deck 38 is constructed and arranged to provide uniform distribution of the liquid over the cross-section of bed 40.

It will be observed that riser 24 does not extend above distribution deck 38 and in fact only extends beyond the top of the bed of particulate solid 40. This construction is presently preferred when the gaseous material, such as hydrogen-containing recycle gas, is a necessary adjunct to the reaction taking place in the bed of particulate solid 40. The bed 40 of particulate solid is supported in any suitable manner as by perforated plate 41.

While the direction of flow of both charge oil and gaseous reactant, e.g., recycle gas containing hydrogen through the catalyst bed is concurrent as illustrated in FIGURE 2, it can also be countercurrent as shown in the co-pending application for U.S. Letters Patent No. 662,286 filed May 28, 1957, in the name of Vernon O. Bowles.

Illustrative of the present method of controlling reactor temperature is the hydrocracking of a heavy residuum. Reactor conditions for cracking a 25 percent bottoms (heavy residuum) from Kuwait crude are presented in the following tabulation:

Catalyst: Mixture of oxides of cobalt and molybdenum on alumina support.
Feed: Heavy residuum (25 percent bottoms) from Kuwait crude.

|  | Broad | Preferred |
|---|---|---|
| Recycle Oil/Fresh Feed | 10–25 | 15–20 |
| Reactor Pressure, p.s.i.g | 1,000–4,000 | 2,000–2,500 |
| Reactor Temp., °F | 750–950 | 800–850 |
| Hydrogen, s.c.f./b | 2,000–20,000 | 4,000–8,000 |

We claim:

1. A method of carrying out an exothermic reaction in the presence of particle-form solid catalytic material in a reaction zone at a reaction pressure in excess of 1000 p.s.i.g. by direct contact between a liquid and a gaseous reactant at a temperature in excess of 700° F., the optimum reaction temperature for the desired reaction being within about 25° F. of the temperature at which at least one undesirable reaction occurs, comprising passing both the liquid reactant and the gaseous reactant through and in direct contact with a static bed of the aforesaid particle-form solid catalytic material to produce a liquid static bed effluent, controlling the reaction temperature at substantially said optimum temperature by recycling a recycle portion of the aforesaid liquid static bed effluent in the ratio of about 5 to about 40 volumes of the aforesaid liquid static bed effluent per volume of fresh liquid reactant, supplying the total energy required for recycling said recycle portion of said liquid static bed effluent in one of said reactants, and recycling said recycle portion of the aforesaid liquid static bed effluent entirely within the reaction system and hence without substantial loss of heat from the reaction system.

2. A method as set forth in claim 1 wherein the energy is supplied by the fresh liquid reactant.

3. A method as set forth in claim 1 wherein the energy is supplied by the gaseous reactant.

4. In a vertical cylindrical container, a distribution deck rigidly mounted horizontally in a liquid- and gas-tight manner in the upper section thereof, a catalyst bed support rigidly mounted horizontally in a suitable manner in the lower section thereof vertically spaced from the bottom of said container to provide a reaction bed effluent liquid pool section therebelow, a gaseous reactant inlet vertically spaced above said distribution deck, a product outlet vertically spaced from the bottom of said container and positioned intermediate the bottom of said container and said catalyst bed support, at least one turbine driven pump mounted in said vertical cylindrical container with at least the pump intake positioned intermediate the bottom of said vertical cylindrical container and said product outlet, means for introducing fresh liquid reactant into said turbine as the driving fluid, conduit means for conveying said fresh liquid reactant from the outlet of said turbine to the vicinity of the intake of said pump, and conduit means for conveying recycled reaction bed effluent liquid and fresh liquid reactant from the outlet of said pump to said distribution deck.

5. In a vertical cylindrical container, a distribution deck rigidly mounted horizontally in a suitable manner in the upper section thereof, a catalyst bed support rigidly mounted horizontally in a suitable manner in the lower section thereof vertically spaced from the bottom of said container to provide a reaction bed effluent liquid pool section therebelow, a gaseous reactant inlet vertically spaced above said distribution deck, a product outlet vertically spaced from the bottom of said container and positioned intermediate the bottom of said vertical cylindrical container and said catalyst bed support, at least one gas turbine driven pump mounted in said vertical cylindrical container with at least the pump intake positioned intermediate said product outlet and the bottom of said vertical cylindrical container, means for introducing gaseous reactant into said turbine as the driving fluid, conduit means for conveying said gaseous reactant from the outlet of said turbine to a point above the top of the catalyst bed, means for introducing fresh liquid feed into said vertical cylindrical container at a locus in the vicinity of the intake of said pump, and conduit means for conveying the discharge of said pump to said distribution deck.

6. In a vertical cylindrical container, a distribution deck rigidly mounted horizontally in a liquid- and gas-tight manner in the upper section thereof, a catalyst bed support rigidly mounted horizontally in a liquid- and gas-tight manner in the lower section thereof vertically spaced from the bottom of said container to provide a reaction bed effluent liquid pool section therebelow, a product outlet vertically spaced intermediate the bottom of said container and said catalyst bed support, at least one gas turbine driven pump mounted in said vertical cylindrical container with at least the pump intake positioned intermediate said product outlet and the bottom of said vertical cylindrical container, means for introducing gaseous reactant into said turbine as the driving fluid, conduit means for conveying said gaseous reactant from the outlet of said turbine to a point above the top of the catalyst bed, means for introducing fresh liquid feed into said vertical cylindrical container at a locus in the vicinity of the intake of said pump, and conduit means for conveying the discharge of said pump to said distribution deck.

7. In a vertical cylindrical container, a distribution deck rigidly mounted horizontally in a liquid- and gas-tight manner in the upper section thereof, a catalyst bed support rigidly mounted horizontally in a liquid- and gas-tight manner in the lower section thereof vertically spaced from the bottom of said container to provide a reaction bed effluent liquid pool section therebelow, a gaseous reactant inlet vertically spaced above said distribution deck, a product outlet vertically spaced from the bottom of said container positioned intermediate said catalyst bed support and the bottom of said vertical cylindrical container, at least one gas turbine driven pump mounted in said vertical cylindrical container with at least the pump intake positioned intermediate said product outlet and the bottom of said vertical cylindrical container, means for introducing gaseous reactant into said turbine as the driving fluid, conduit means for conveying said gaseous reactant from the outlet of said turbine to a point above the top of the catalyst bed and means for introducing fresh feed directly onto said distribution deck.

8. A catalytic reactor comprising a vertical reactor shell, fluid-permeable catalyst support means spaced above the bottom of said shell defining a liquid accumulation space within said shell below said catalyst support means, liquid feed distribution means arranged in the upper portion of said shell and spaced above said catalyst support means for distribution of liquid materials to a catalyst bed arranged on said catalyst support means, a pump in said liquid accumulation space arranged to take suction on liquid in said space, a fluid-powered motor arranged in said space and operatively connected to drive said pump, means to supply as motive fluid to said motor a charge fluid for said reactor, means for diverting exhaust of said motor to a reaction space between said liquid distributing means and said catalyst support means, conduit means for conveying discharge of said pump to said liquid distribution means, and means to withdraw fluid reaction product from the portion of said shell below said catalyst support means.

References Cited in the file of this patent
UNITED STATES PATENTS

| | | |
|---|---|---|
| 1,154,495 | Ellis | Sept. 21, 1915 |
| 1,247,095 | Ellis | Nov. 20, 1917 |
| 1,671,573 | Erlenbach | May 29, 1928 |
| 2,167,698 | Vose | Aug. 1, 1939 |
| 2,266,095 | Thayer | Dec. 16, 1941 |
| 2,354,355 | Abrams | July 25, 1944 |